United States Patent
Ravikumar et al.

(10) Patent No.: US 12,141,083 B1
(45) Date of Patent: *Nov. 12, 2024

(54) CONTROL CALIBRATION TIMING TO AVOID MEMORY WRITE BLACKOUT PERIOD

(71) Applicant: Waymo LLC, Mountain View, CA (US)

(72) Inventors: Sabareeshkumar Ravikumar, Sunnyvale, CA (US); Daniel Rosenband, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/171,068

(22) Filed: Feb. 17, 2023

Related U.S. Application Data

(63) Continuation of application No. 17/139,111, filed on Dec. 31, 2020, now Pat. No. 11,609,868.

(51) Int. Cl.
G06F 13/14 (2006.01)
G06F 13/16 (2006.01)

(52) U.S. Cl.
CPC ................ *G06F 13/1668* (2013.01)

(58) Field of Classification Search
CPC .......... G06F 13/1668; G06F 12/0246
See application file for complete search history.

(56) References Cited

U.S. PATENT DOCUMENTS

| | | | |
|---|---|---|---|
| 6,445,624 B1 | 9/2002 | Janzen et al. | |
| 6,484,232 B2 | 11/2002 | Olarig et al. | |
| 6,674,552 B1 | 1/2004 | Wang | |
| 6,845,460 B2 | 1/2005 | Lee et al. | |
| 7,432,731 B2 | 10/2008 | Bains et al. | |
| 7,773,440 B2 | 8/2010 | Kim et al. | |
| 8,019,957 B1 * | 9/2011 | White | G11C 29/028 702/89 |
| 8,228,747 B2 | 7/2012 | Orishi | |
| 8,307,270 B2 | 11/2012 | Kim et al. | |
| 8,321,627 B1 | 11/2012 | Norrie et al. | |
| 8,760,945 B2 | 6/2014 | Jeon | |
| 8,824,222 B2 | 9/2014 | Ware et al. | |
| 9,136,987 B2 | 9/2015 | Hodges et al. | |
| 9,430,418 B2 | 8/2016 | Meaney et al. | |
| 9,632,954 B2 | 4/2017 | Brittain et al. | |
| 9,711,239 B2 | 7/2017 | Venkatasan et al. | |
| 9,811,873 B2 | 11/2017 | Lee et al. | |
| 9,852,021 B2 | 12/2017 | Nale et al. | |
| 10,032,502 B1 | 7/2018 | Gopalan et al. | |

(Continued)

OTHER PUBLICATIONS

DDR4 SDRAM—Initialization, Training and Calibration, https://www.systemverilog.io/ddr4-Initialization-and-Calibration, accessed Jun. 10, 2021, pp. 1-13.

*Primary Examiner* — Cheng Yuan Tseng
(74) *Attorney, Agent, or Firm* — McDonnell Boehnen Hulbert & Berghoff LLP

(57) ABSTRACT

One example system for preventing data loss during memory blackout events comprises a memory device, a sensor, and a controller operably coupled to the memory device and the sensor. The controller is configured to perform one or more operations that coordinate at least one memory blackout event of the memory device and at least one data transmission of the sensor.

20 Claims, 8 Drawing Sheets

(56) References Cited

U.S. PATENT DOCUMENTS

| | | | |
|---|---|---|---|
| 10,068,634 B2 | 9/2018 | Glancy et al. | |
| 10,109,328 B2 | 10/2018 | Nomura | |
| 10,192,607 B2 | 1/2019 | Wang | |
| 10,304,547 B2 | 5/2019 | Choi et al. | |
| 10,431,268 B2 | 10/2019 | Choi et al. | |
| 10,506,237 B1 | 12/2019 | Liu et al. | |
| 10,572,183 B2 | 2/2020 | Arora et al. | |
| 10,664,173 B2 | 5/2020 | Howe et al. | |
| 11,064,131 B1 * | 7/2021 | Aluru | H04N 23/60 |
| 11,609,868 B1 * | 3/2023 | Ravikumar | G06F 13/1668 |
| 2005/0231357 A1 | 10/2005 | Kanayama et al. | |
| 2012/0250434 A1 | 10/2012 | Song | |
| 2017/0300329 A1 | 10/2017 | Noguchi et al. | |
| 2018/0293025 A1 | 10/2018 | Sakai et al. | |
| 2021/0141747 A1 | 5/2021 | Jeong et al. | |
| 2021/0192153 A1 | 6/2021 | Kunieda | |
| 2021/0264968 A1 | 8/2021 | Kim | |
| 2021/0390071 A1 | 12/2021 | Shen et al. | |

\* cited by examiner

CONTROL CALIBRATION TIMING TO AVOID MEMORY WRITE BLACKOUT PERIOD

REFERENCE TO RELATED APPLICATION

This is a continuation of U.S. patent application Ser. No. 17/139,111, filed Dec. 31, 2020, the entirety of which is hereby incorporated by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices that scan and record data from the vehicle's surroundings. These devices in combination (and in some cases alone) may be used determine the location of the object in three-dimensional space.

The various types of sensors are electrically coupled to processors and computer readable memory by integrated circuits. Data from the sensors is written to the computer readable memory.

Various conditions can cause temporary memory blackouts. During a memory blackout, data cannot be written to memory. Devices, such as processors or application-specific integrated circuits ("ASICs"), have internal buffer memory to store data during short memory blackouts. However, longer blackouts can cause data to be lost.

SUMMARY

In one example, a system for preventing data loss during memory blackout events comprises a memory device, a sensor, and a controller operably coupled to the memory device and the sensor. The controller is configured to perform one or more operations that coordinate at least one memory blackout event of the memory device and at least one data transmission of the sensor.

In another example, a method of preventing data loss comprises determining a data transfer rate of a sensor, determining a memory blackout event timing of a memory device, and transmitting a control signal to the sensor to affect timing of a data transfer based on the memory blackout event timing.

In a further example, a method of preventing data loss comprises determining a data transfer rate of a sensor, determining a memory blackout event timing of a memory device, and transmitting a control signal to the memory device to affect the memory blackout event timing based on the data transfer rate of the sensor.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
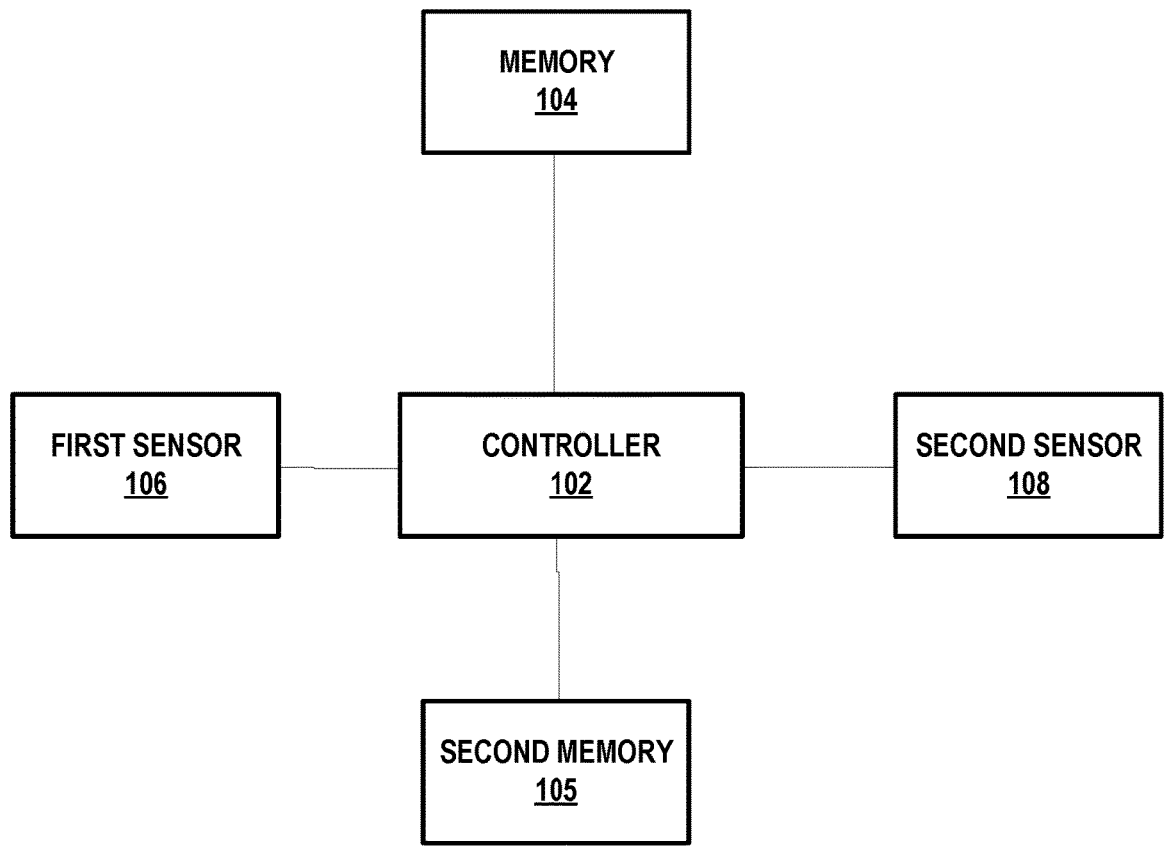
FIG. 1 is a simplified block diagram of a system, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

A vehicle, such as an autonomous vehicle, can utilize data from multiple sensors, such as active sensors, such as light detection and ranging (LIDAR) devices and radio detection and ranging (RADAR) devices to generate a representation of a scanned environment. The autonomous vehicle can also utilize passive sensors, such as cameras, microphones, GPS units, passive infrared sensors, and passive radio frequency sensors. The data from the multiple sensors can be used to identify objects within the scanned environment and estimate the distance between the vehicle and the identified objects.

A sensor system may include one or more sensors (such as any of the sensors described above), one or more processors for processing the sensor data, and computer readable memory. Data from the sensors can be stored in the computer readable memory, either directly or after being processed by the one or more processors.

During operation, the computer readable memory can experience temporary blackout periods during which the memory is not accessible for writing to or reading from. Some sources of blackouts are preplanned events for recalibrating or retraining the memory to account for changes in environmental conditions. Example causes of memory blackouts include DQ calibration, ZQ calibration, pstate changes, and memory training/retraining. The types of blackout events can vary between different types of memory devices. In some examples, a processor can trigger one or more blackout events by sending a triggering control signal to the computer readable memory. Alternatively or additionally, the processor can suppress blackout events by sending a suppressing control signal to the computer readable memory.

Active sensors, such as RADAR, LIDAR, or SONAR sensors, include an emitter for emitting a signal into the environment, and a detector for detecting the reflected signal. The signal often comprises intermittent bursts of light, radio waves, or sound waves. Accordingly, active sensors generate data in intermittent bursts as the reflected signals are detected. In some forms, a processor can control the timing of an active sensor so as to schedule when data is transmitted from the sensor to the processor or computer readable memory. Alternatively or additionally, a processor can determine when the data will be transmitted by the sensor either through receipt of a trigger signal or based on the timing of previous transmissions.

Multiple types of sensors, including passive sensors, collect data over a period of time and then transmit the data as a burst in response to a trigger. Example triggers include a predetermined period of time after the last transmission, or a predetermined amount of data is collected. In some examples, a processor can schedule the trigger of a sensor in order to control when the burst of data is transmitted.

A processor can include an internal memory buffer. The memory buffer temporarily stores data to be transmitted to the computer readable memory. In operation, data can be stored in the memory buffer while the computer readable memory is experiencing a memory blackout. If the blackout ends before the amount of data to be transmitted exceeds the capacity of the buffer memory, then data loss is prevented.

Example devices, systems, and methods herein relate to planning sensor data transmission, memory blackout events, or combinations thereof to avoid data loss. One example system may include a controller having one or more processors, computer readable memory, and a plurality of sensors. The controller is operably coupled to the computer readable memory and the plurality of sensors such that the controller can control the timing of the memory blackout events and/or the sensor data transmissions.

FIG. 1 illustrates a system 100 having a controller 102, a memory device or computer readable memory 104, a first sensor 106, and a second sensor 108. In operation, the first sensor 106 and second sensor 108 collect data representing the environment around the system and transmit the data to the controller 102. The controller 102 processes the data received from the first sensor 106 and the second sensor 108 and then transmits it to the computer readable memory 104 for storage.

In some embodiments, the first sensor 106 and the second sensor 108 transmit the unprocessed sensor data directly to the computer readable memory 104. The controller 102 can read the sensor data from the computer readable memory 104 for processing.

The first sensor 106 is an active sensor configured to scan part of the environment around the system 100. In some examples, the first sensor 106 is one of a LIDAR system, RADAR system, or SONAR system. In some forms, the system 100 includes a plurality of active sensors.

The second sensor 108 is a passive sensor configured to receive information relating to the environment around the system 100. In some examples, the second sensor 108 is a camera, a microphone, a GPS unit, a passive infrared sensor, or a passive radio frequency sensor. In some forms, the system 100 includes a plurality of passive sensors.

The controller 102 is a computing device having one or more processors. The one or more processors are configured to process sensor data, control the first sensor 106, control the second sensor 108, and/or control the computer readable memory 104. In some embodiments, the controller 102 is a single centralized processor configured to do each of the above functions. In alternative embodiments, the controller 102 comprises multiple distinct sub-controllers including a memory controller, a sensor controller, and a data processor.

The controller 102 has internal memory. The internal memory includes buffer memory for the one or more processors. The buffer memory temporarily stores data for transmission from the processor. In some forms, the controller 102 includes additional computer readable memory storing executable instructions. When executed by the controller 102, the executable instructions cause the system 100 to perform the functions described below. Alternatively, the executable instructions are stored on the computer readable memory 104. In still further examples, the controller 102 comprises an ASIC and no executable instructions are stored.

The computer readable memory 104 includes one or more memory devices configured to store electronic data. In some forms, the computer readable memory 104 includes volatile or non-transitory memory such a Random Access Memory ("RAM"), Dynamic Random Access Memory ("DRAM"), Double Data Rate ("DDR") memory, or other types of computer readable memory.

In operation, the controller 102 transmits a control signal to the computer readable memory 104 to control the timing of one or more memory blackout events. The controller 102 can transmit a trigger control signal to the computer readable memory 104 to cause the one or more blackout events to occur at a specific time in response to receipt of the trigger control signal. Alternatively or additionally, the controller 102 can transmit a suppressing control signal to prevent the computer readable memory 104 from performing a blackout event during a specific time period.

In some forms, the controller 102 is further configured to receive a signal from the computer readable memory 104 indicating the timing of one or more blackout events. The signal can be a trigger signal transmitted a predetermined amount of time prior to the blackout event. Alternatively, the signal is a schedule signal indicating the timing or frequency of a multiple blackout events. In one form, the controller 102 is configured to predict the timing of one or more memory blackout events based on the timing of previous memory blackout events.

In some examples, the controller 102 is further configured to transmit a control signal to the first sensor 106. The control signal controls the timing of data transmission from the first sensor 106 to the controller 102 or the computer readable memory 104. In some forms, the control signal controls the timing of a scan by the first sensor 106. Specifically, the control signal controls the timing of signal transmission by the first sensor 106 into the environment around the system 100.

In some examples, the controller 102 is further configured to transmit a control signal to the second sensor 108. The control signal controls the timing of data transmission from the second sensor 108 to the controller 102 or the computer readable memory 104. In some forms, the control signal controls the timing of the trigger event causing the second sensor 108 to transmit data. For example, the control signal schedules data transmission from the second sensor 108 to occur at specific times.

In some forms, the controller 102 is further configured to receive a signal from one or both of the first sensor 106 and the second sensor 108 indicating the timing of data transmission therefrom. In still further examples, the controller 102 is configured to predict the timing of data transmissions from one or both of the first sensor 106 and the second sensor 108 based on the timing of previous data transmissions and/or stored system information about the first sensor 106 or the second sensor 108.

The controller 102 is configured to coordinate the transmission of data from the first sensor 106 and second sensor 108 and the memory blackout events of the computer readable memory 104 to reduce the risk of data loss during memory blackout events. For example, the controller 102 can use information relating to the amount of data to be transmitted by the first sensor, the amount of data to be transmitted by the second sensor, the amount of buffer memory available, the timing of the data transmissions, the timing of the blackout events, and the length of the blackout events to coordinate the system 100.

In some forms, the system 100 further includes a second computer readable memory 105 operably coupled to the controller 102. In operation, the controller 102 controls the memory blackout events of both the computer readable memory 104 and the second computer readable memory 105. In some forms, the controller 102 schedules one or more blackout events for the computer readable memory 104 when the amount of data being generated by the sensors 106 and 108 can be entirely written to the second computer readable memory 105.

Figure 2:
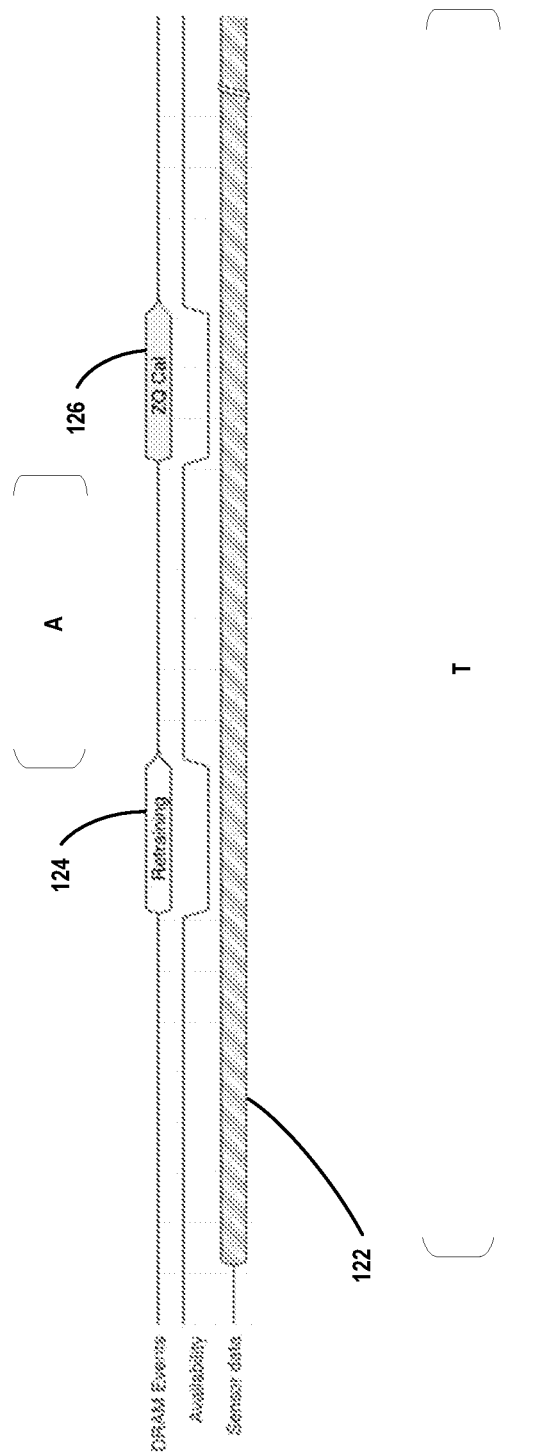
FIG. 2 illustrates a schedule for sensor data transmission and memory blackout events according to example embodiments.

In some examples, the controller 102 schedules multiple blackout events to be spaced apart during the collection of data from the first sensor 106 and/or the second sensor 108. FIG. 2 illustrates a blackout event schedule compared to a sensor data transmission schedule.

The sensor data 122 is shown to be transmitted continuously over a period of time T. It is understood that FIG. 2 is a simplified representation of the schedule. In practice, the sensor data 122 can be transmitted as a series of separate data transmissions spread over the period of time T.

During the period of time T, the computer readable memory has a first blackout event 124 and a second blackout event 126. As shown, the computer readable memory is available during the period of time T, except during the first blackout event 124 and the second blackout event 126. The first blackout event 124 is illustrated as memory retraining and the second blackout event 126 is illustrated as ZQ calibration. However, it is understood that the blackout events 124, 126 can be any standard memory blackout event.

In operation, the sensor data 122 transmitted during the first blackout event 124 and the second blackout event 126 is temporarily stored in buffer memory. The controller schedules the blackout events 124, 126 based on information representing the expected rate of sensor data 122, the expected length of the first memory blackout 124, the expected length of the second memory blackout 126, and the amount of buffer memory available.

The first memory blackout event 124 and the second memory blackout event 126 are separated by a time A. The length of time A allows the backlog of sensor data 122 stored in the buffer memory during the first blackout event 124 to be transmitted to the computer readable memory prior to the second blackout event 126, so that there is no loss of data. The length of time A is based on the data transfer rate between the buffer data and the computer readable memory, the rate at which sensor data 122 is transmitted, the length of the first memory blackout event 124, and the size of the buffer memory.

To achieve the blackout event schedule shown in FIG. 2, the controller 102 transmits trigger control signals to computer readable memory 104 at predetermined times to cause the first memory blackout event 124 and the second memory blackout event 126 to occur. Alternatively or additionally, the controller transmits a suppressing control signal to computer readable memory 104 during the time A to prevent the second memory blackout event 126 from occurring for a predetermined amount of time after the first memory blackout event 124.

Figure 3:
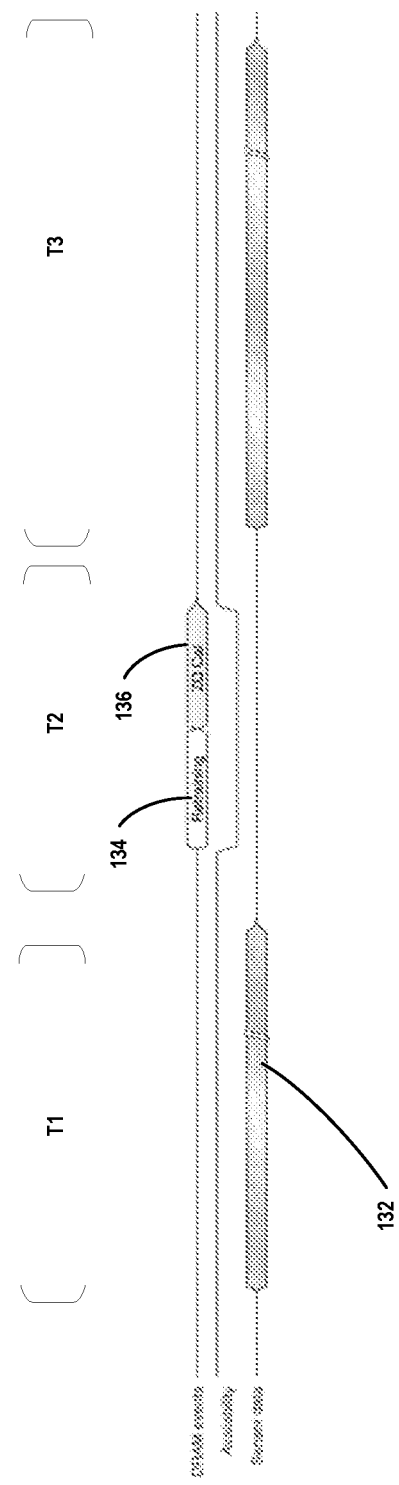
FIG. 3 illustrates a schedule for sensor data transmission and memory blackout events according to example embodiments.
Figure 4A:
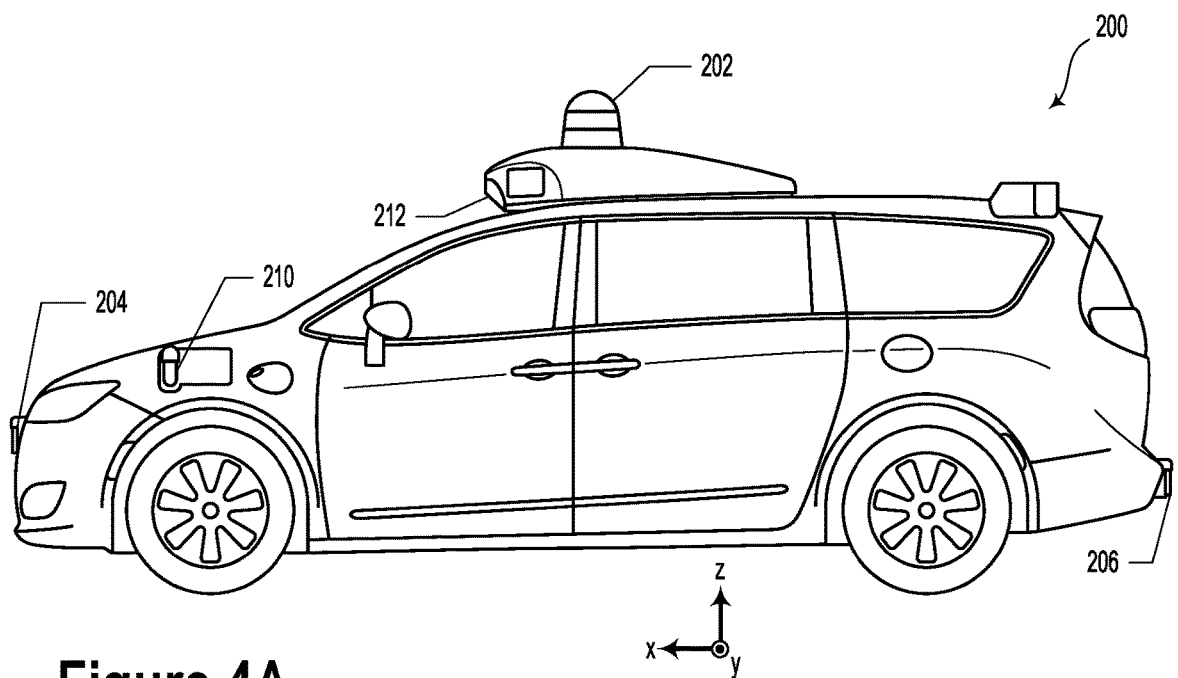
FIG. 4A illustrates a vehicle equipped with a sensor system, according to an example embodiment.
Figure 4B:
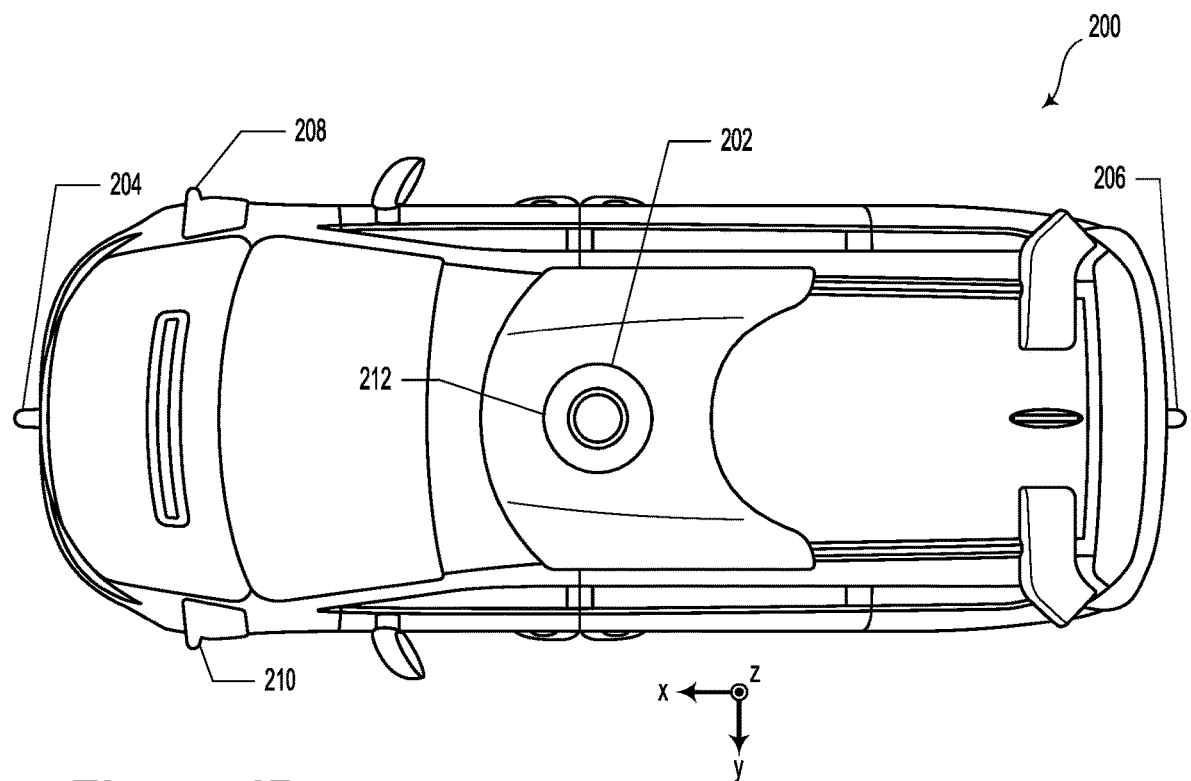
FIG. 4B illustrates a vehicle equipped with a sensor system, according to an example embodiment.
Figure 4C:
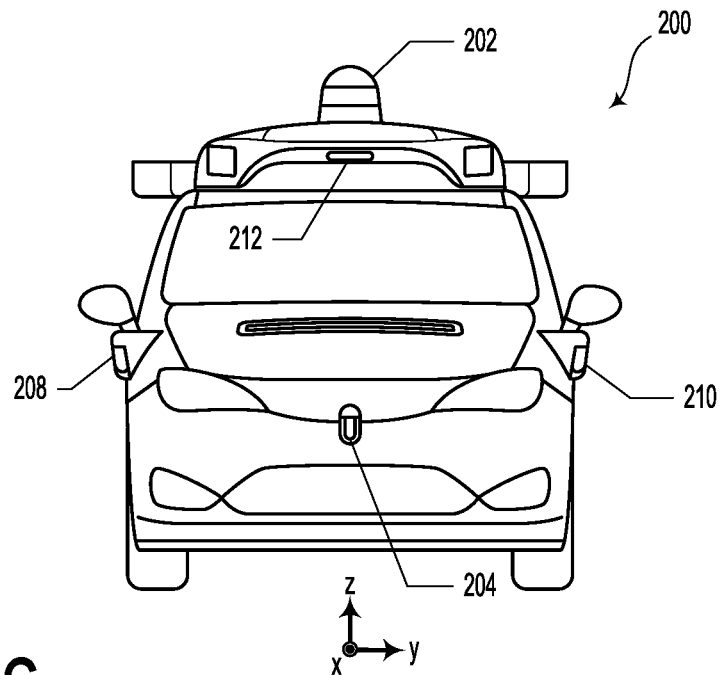
FIG. 4C illustrates a vehicle equipped with a sensor system, according to an example embodiment.
Figure 4D:
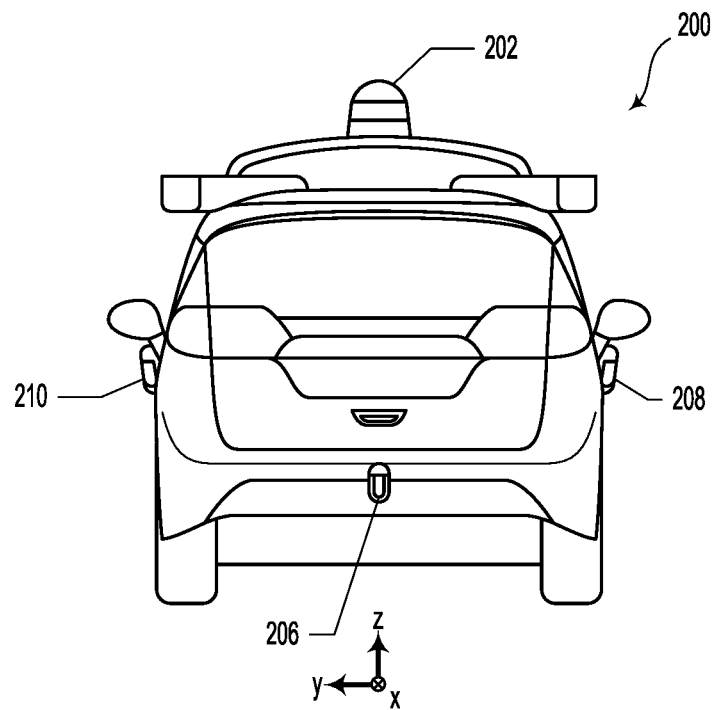
FIG. 4D illustrates a vehicle equipped with a sensor system, according to an example embodiment.
Figure 4E:
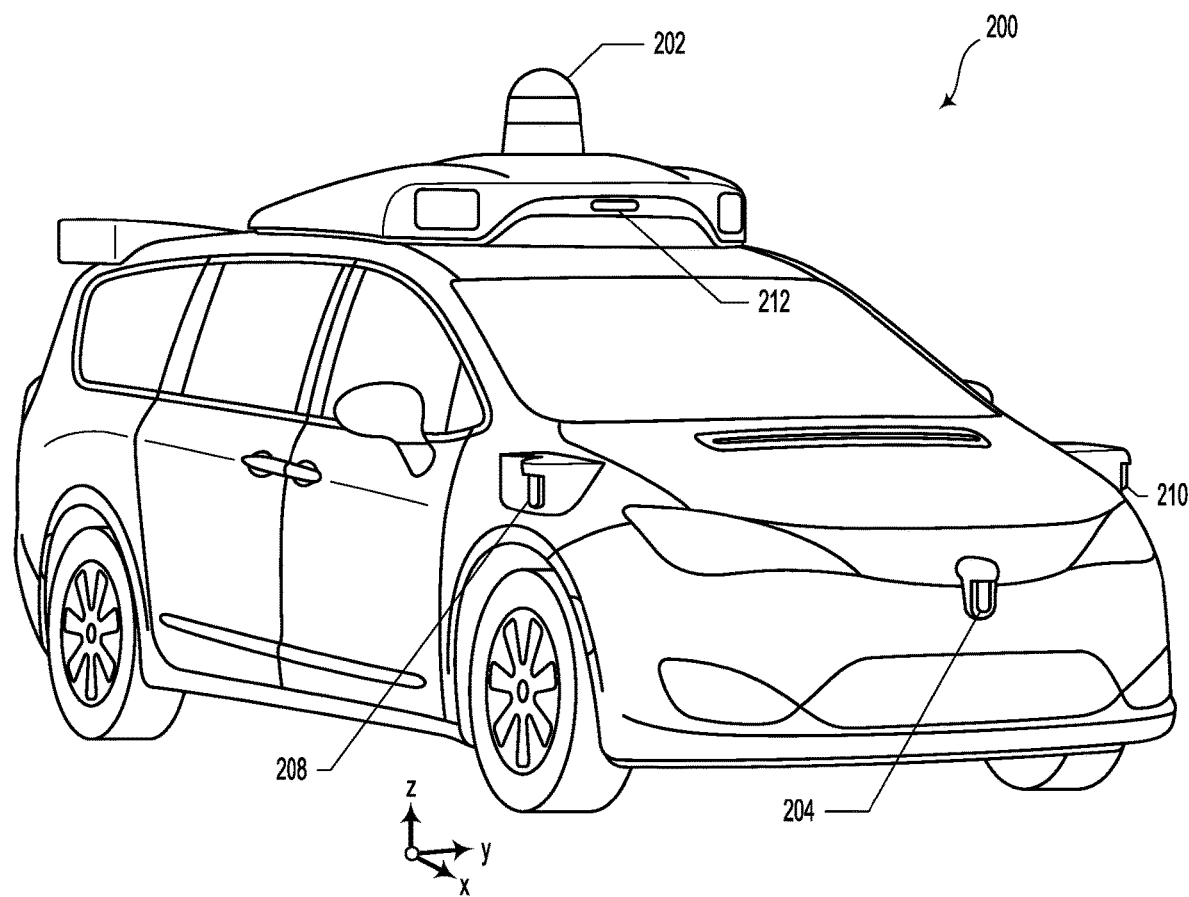
FIG. 4E illustrates a vehicle equipped with a sensor system, according to an example embodiment.

FIG. 3 illustrates an alternative memory blackout and sensor data schedule that prevents data loss. Sensor data 132 is transmitted intermittently. During time periods T1 and T3, sensor data 132 is transmitted to the computer readable memory. No memory blackout events are scheduled during T1 or T3.

During T2, no sensor data 132 is transmitted to the computer readable memory. A first memory blackout event 124 and a second memory blackout event 136 occur consecutively during T2. The first blackout event 134 is illustrated as memory retraining and the second blackout event 136 is illustrated as ZQ calibration. However, it is understood that the blackout events 134, 136 can be any standard memory blackout event.

To achieve the schedule shown in FIG. 3, the controller 102 transmits a trigger control signal to computer readable memory 104 during T2 to cause the memory blackout events 134, 136 to occur. Alternatively or additionally, the controller 102 transmits a suppressing control signal to computer readable memory 104 during T1 and T3 to prevent memory blackout events from occurring while sensor data is being transmitted.

The sensor data 132 includes data from one or more sensors. In some examples, the controller 102 transmits control signals to a plurality of sensors, such as sensors 106 and 108, to synchronize data transmissions therefrom to occur during T1 and T3. This synchronization creates the period T2 during which sensor data is not being received from any of the plurality of sensors.

In some examples, a controller, such as the controller 102 described above, combines both of the schedules illustrated in FIGS. 2 and 3. For example, high data sensors, such as LIDAR or RADAR sensors, are configured to transmit data intermittently as shown in FIG. 3. Memory blackout events are scheduled to occur during periods of time when the high data sensors are not transmitting data.

Low data sensors, such as microphones or GPS units, are configured to transmit data relatively continuously. Memory blackout events are spaced to enable data from the low data sensors to be temporarily stored in buffer memory during individual memory blackout events.

The system 100 described above is a sensor system configured to detect information relating to an environment around the system 100. In some examples, the system 100 is used within an autonomous vehicle to aid in navigation and operation of the vehicle. FIGS. 4A, 4B, 4C, 4D, and 4E illustrate a vehicle 200, according to an example embodiment. In some embodiments, the vehicle 200 could be a semi- or fully-autonomous vehicle. While FIGS. 4A, 4B, 4C, 4D, and 4E illustrates vehicle 200 as being an automobile (e.g., a passenger van), it will be understood that vehicle 200 could include another type of autonomous vehicle, robot, or drone that can navigate within its environment using sensors and other information about its environment.

In some examples, the vehicle 200 may include one or more sensor systems 202, 204, 206, 208, 210, and 212. In some embodiments, sensor systems 202, 204, 206, 208, 210, and/or 212 could include the sensors 106 and 108 as illustrated and described in relation to FIG. 1. In other words, the systems described elsewhere herein could be coupled to the vehicle 200 and/or could be utilized in conjunction with various operations of the vehicle 200. As an example, the system 100 could be utilized to schedule memory blackout events such that data from the sensor systems 202, 204, 206, 208, 210, and/or 212 is not lost.

While the one or more sensor systems 202, 204, 206, 208, 210, and 212 are illustrated on certain locations on vehicle 200, it will be understood that more or fewer sensor systems could be utilized with vehicle 200. Furthermore, the locations of such sensor systems could be adjusted, modified, or otherwise changed as compared to the locations of the sensor systems illustrated in FIGS. 4A, 4B, 4C, 4D, and 4E.

One or more of the sensor systems 202, 204, 206, 208, 210, and/or 212 could include LIDAR sensors. For example, the LIDAR sensors could include a plurality of light-emitter devices arranged over a range of angles with respect to a given plane (e.g., the x-y plane). For example, one or more of the sensor systems 202, 204, 206, 208, 210, and/or 212 may be configured to rotate about an axis (e.g., the z-axis) perpendicular to the given plane so as to illuminate an environment around the vehicle 200 with light pulses. Based on detecting various aspects of reflected light pulses (e.g., the elapsed time of flight, polarization, intensity, etc.), information about the environment may be determined.

In an example embodiment, sensor systems 202, 204, 206, 208, 210, and/or 212 may be configured to provide respective point cloud information that may relate to physical objects within the environment of the vehicle 200. The point cloud information can be used to identify objects within the environment around the vehicle 200, which can be identified as the source of a siren sound detected by the microphone device 102. While vehicle 200 and sensor systems 202, 204, 206, 208, 210, and 212 are illustrated as including certain features, it will be understood that other types of sensor systems are contemplated within the scope of the present disclosure.

While LIDAR systems with single light-emitter devices are described and illustrated herein, LIDAR systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 4A-4E illustrate various lidar sensors attached to the vehicle 200, it will be understood that the vehicle 200 could incorporate other types of sensors.

The vehicle 200 may also include additional types of sensors mounted on the exterior thereof, such as the temperature sensor, sound sensor, LIDAR sensor, RADAR sensor, SONAR sensor, and/or cameras described above. Each of these additional types of sensors would be communicably coupled to computer readable memory.

Figure 5:
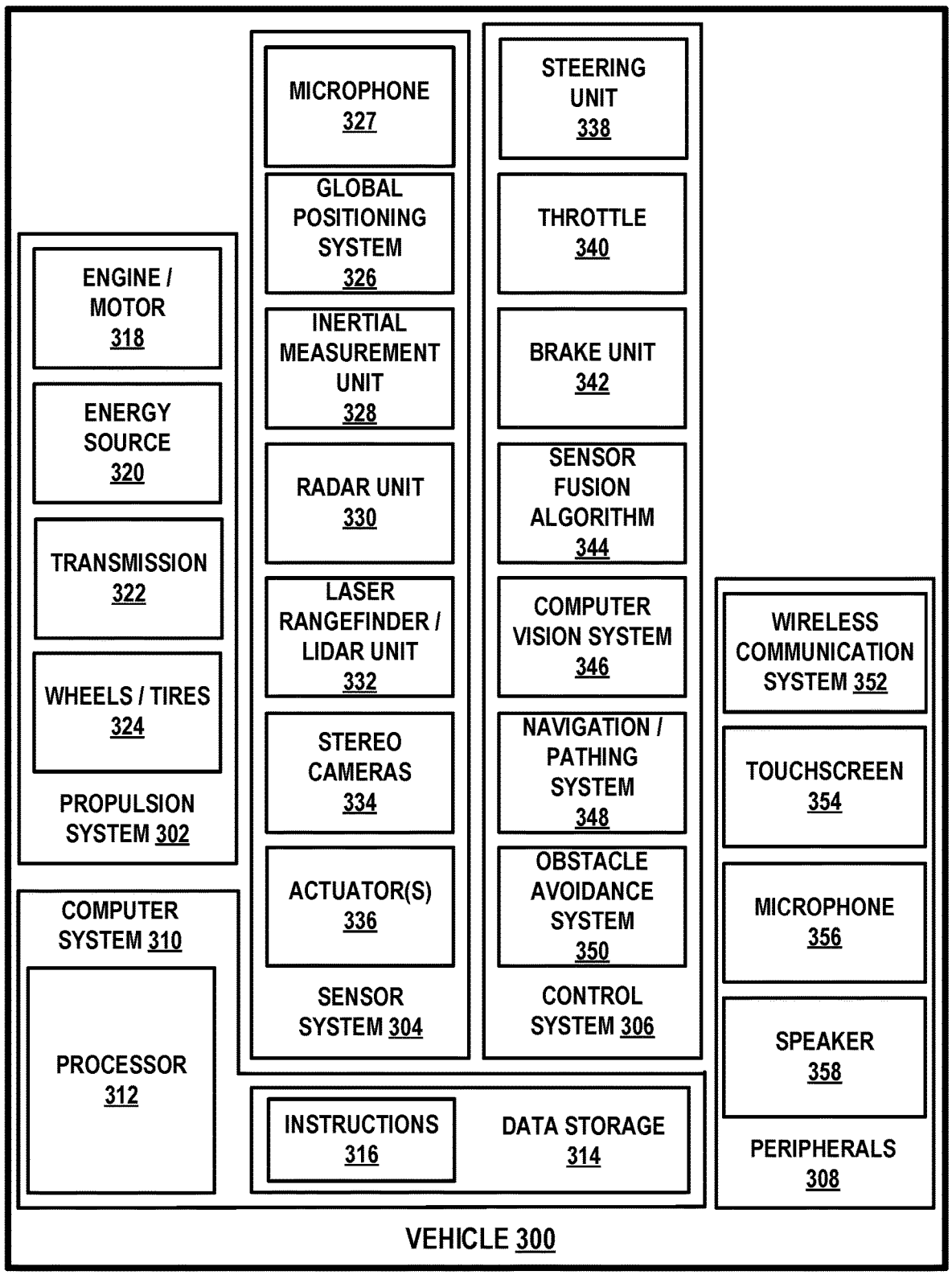
FIG. 5 is a simplified block diagram of a vehicle, according to example embodiments.

FIG. 5 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors. For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. The sensor system 304 further includes computer readable memory which receives and stores data from the sensors. As shown, sensor system 304 includes a microphone 327, a Global Positioning System (GPS) 326, an inertial measurement unit (IMU) 328, a RADAR unit 330, a laser rangefinder and/or LIDAR unit 332, and a stereo camera system 334. Sensor system 304 may include additional sensors as well, including, for example, sensors that monitor internal systems of the vehicle 300 (e.g., an $O_2$ monitor, a fuel gauge, an engine oil temperature, etc.). Other sensors are possible as well.

The sensor system 304 can include the sensors 106, 108 of the system 100 described above. In some examples, the sensor system 304 includes a controller configured to prevent data loss as the result of memory blackout events, such as the controller 102 described above.

The microphone module 327 may be any sensor (e.g., acoustic sensor) configured to detect and record sounds originating outside of the vehicle 300.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, at least some of which may take the form of devices 100 and/or 200 among other LIDAR device configurations, for instance.

The stereo cameras 334 may be any cameras (e.g., a still camera, a video camera, etc.) configured to capture images of the environment in which the vehicle 300 is located.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350. In some examples, the control system 306 includes a controller configured to prevent data loss as the result of memory blackout events, such as the controller 102 described above.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The sensor fusion algorithm 344 is operated on a processor, such as the external processor discussed above. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by stereo cameras 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, microphone 327, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

In some examples, the computer system 310 is configured to execute instructions stored in computer readable memory which one or more processors to control sensors in the sensor system 304 to schedule data transmissions to avoid data loss as the result of memory blackout events. Alternatively or additionally, the instructions cause one or more processors to control computer readable memory to schedule memory blackout events to avoid data loss during the memory blackout events.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

Figure 6:
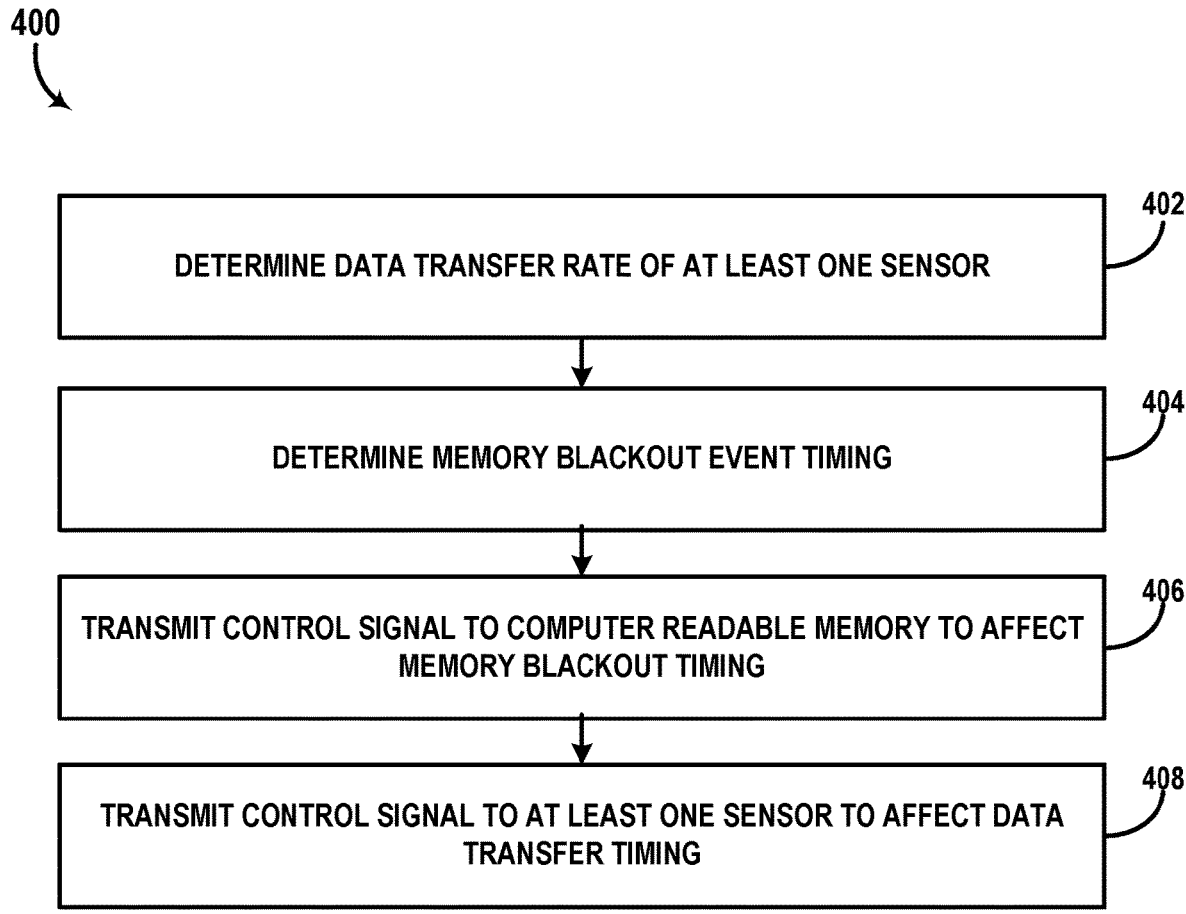
FIG. 6 is a flowchart of a method, according to example embodiments.

FIG. 6 is a flowchart of a method 400, according to example embodiments. The method 400 presents an embodiment of a method that could be used with the system 100 or the vehicles 200 and 300, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

The method 400 is a method of preventing data loss during memory blackout events. More specifically, the method 400 is a method of controlling the timing of sensor data transmissions and the timing of memory blackout events to limit the amount of sensor data transmitted during memory blackout.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 400 and other processes and methods disclosed herein, each block in FIG. 6 may represent circuitry that is wired to perform the specific logical functions in the process.

At block 402, method 400 involves determining a data transfer rate of at least one sensor. The data transfer rate can include an average data transfer rate over time of the at least one sensor and/or a peak data transfer rate of the at least one sensor. Additionally, the data transfer rate can include timing and/or frequency of bursts of data transmitted by the at least one sensor. For example, the data transfer rate could be the data transfer rate of the first sensor 106 and/or the second sensor 108 of the system 100 described above.

At block 404, the method 400 involves determining the length of at least one memory blackout event. The length of at least one memory blackout event is the amount of time the computer readable memory is unavailable to receive data as a result of the memory blackout event. The memory blackout event can be any standard memory blackout event, including, for example, DQ calibration, ZQ calibration, pstate changes, or memory training/retraining.

At block 406, a controller transmits a control signal to computer readable memory to affect the timing of at least one memory blackout event based on the data transfer rate of at least one sensor. For example, the controller can transmit a control signal causing two memory blackout events to be spaced apart by an amount of time determined in part by the data transfer rate of the at least one sensor. Alternatively or additionally, the control signal can cause at least one memory blackout event to occur during a period of reduced data transmission from the at least one sensor.

At block 408, the controller transmits a control signal to at least one sensor to affect the timing of sensor data transmission based on the timing of at least one memory blackout event. For example, the control signal can synchronize the intermittent transmission of data from the at least one sensor such that data is not transmitted during one or more memory blackout events. In some forms, the control signal is sent to one or more of a plurality of sensors to synchronize the sensors such that the plurality of sensors are not transmitting data at the same time. Alternatively, the control signal is sent to one or more sensors of a plurality of sensors to synchronize the sensors such that the data transmission of a first sensor occurs during a period between data transmissions from a second sensor, such that the sensors are not transmitting simultaneously during a memory blackout event.

The above examples of systems and methods for avoiding sensor data loss during memory blackout events involve sensor systems and specifically sensor systems for autonomous vehicles. The methods and systems allow for the use of smaller buffer memory units than would be necessary without the above described methods and systems for avoiding sensor data loss. It is understood that the systems and methods should not be limited to sensor systems or to autonomous vehicles. The systems and methods for avoiding data loss during memory blackout events can be used in other systems having computer readable memory, a processor, and a data source.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A system comprising:
   a memory device;
   a sensor, wherein the sensor comprises one or more cameras; and
   a controller operably coupled to the memory device and the sensor,
   wherein the controller is configured to perform one or more operations that coordinate at least one memory blackout event of the memory device with at least one data transmission of the sensor, wherein the memory blackout event comprises a period during which the memory device is not available for reading or writing,
   wherein the one or more operations comprises transmitting a control signal to the sensor to affect timing of the at least one data transmission of the sensor based on timing of the at least one memory blackout event.

2. The system of claim 1, wherein the at least one memory blackout event includes DQ calibration, ZQ calibration, pstate changes, memory training, memory retraining, or combinations thereof.

3. The system of claim 1, wherein the memory device is volatile memory.

4. The system of claim 1, wherein the controller includes buffer memory.

5. The system of claim 1, wherein the control signal controls timing of a trigger event that causes the sensor to transmit data, wherein the trigger event comprises at least one event selected from the group consisting of a predetermined period of time after a last transmission from the sensor and a predetermined amount of data being collected by the sensor.

6. The system of claim 1, further comprising a second sensor.

7. The system of claim 6, wherein the one or more operations include transmitting a control signal to the sensor to synchronize the data transmission of the sensor with data transmission of the second sensor.

8. The system of claim 1, wherein the one or more operations include transmitting a control signal to the memory device to cause the at least one memory blackout event to occur at least a predetermined amount of time after a previous memory blackout event.

9. A method of preventing data loss, the method comprising:
   determining a data transfer rate of a sensor, wherein the sensor comprises one or more cameras;
   determining timing of at least one memory blackout event of a memory device, wherein the memory blackout event comprises a period during which the memory device is not available for reading or writing; and
   transmitting a control signal to the sensor to affect timing of a data transfer based on the timing of the at least one memory blackout event,
   wherein the control signal affects timing of data transmission from the sensor based on the timing of the at least one memory blackout event.

10. The method of claim 9, wherein transmitting the control signal to the sensor causes the data transfer to synchronize with a data transfer of a second sensor.

11. The method of claim 10, wherein the data transfer of the sensor and the data transfer of the second sensor are synchronized to occur consecutively.

12. The method of claim 10, wherein the data transfer of the sensor and the data transfer of the second sensor are synchronized to occur simultaneously.

13. The method of claim 9, further comprising transmitting a second control signal to the memory device to affect the timing of the at least one memory blackout event.

14. The method of claim 9, wherein the control signal controls timing of a trigger event that causes the sensor to transmit data, wherein the trigger event comprises at least one event selected from the group consisting of a predetermined period of time after a last transmission from the sensor and a predetermined amount of data being collected by the sensor.

15. A non-transitory computer-readable medium storing instructions executable by a processor to carry out one or more operations for coordinating at least one memory blackout event of a memory device with at least one data transmission of a sensor, wherein the sensor comprises one or more cameras, wherein the one or more operations comprises transmitting a control signal to the sensor to affect timing of the at least one data transmission of the sensor based on timing of the at least one memory blackout event, wherein the memory blackout event comprises a period during which the memory device is not available for reading or writing.

16. The non-transitory computer-readable medium of claim 15, wherein the one or more operations further comprises transmitting a control signal to the memory device to affect timing of at least one memory blackout event of the memory device based on data transfer rate of the sensor.

17. The non-transitory computer-readable medium of claim 15, wherein the memory device is volatile memory.

18. The non-transitory computer-readable medium of claim 15, wherein the control signal controls timing of a trigger event that causes the sensor to transmit data, wherein the trigger event comprises at least one event selected from the group consisting of a predetermined period of time after a last transmission from the sensor and a predetermined amount of data being collected by the sensor.

19. The non-transitory computer-readable medium of claim 15, wherein the one or more operations further comprises transmitting a control signal to the sensor to synchronize the data transmission of the sensor with data transmission of a second sensor.

20. The non-transitory computer-readable medium of claim 15, wherein the one or more operations includes transmitting a control signal to the memory device to cause the at least one memory blackout event to occur at least a predetermined amount of time after a previous memory blackout event.

* * * * *